United States Patent
Takahashi

(10) Patent No.: US 9,801,235 B2
(45) Date of Patent: Oct. 24, 2017

(54) GATEWAY DEVICE, COMMUNICATION SYSTEM, AND COMMUNICATION METHOD

(71) Applicant: YOKOGAWA ELECTRIC CORPORATION, Musashino-shi, Tokyo (JP)

(72) Inventor: Hiromi Takahashi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 361 days.

(21) Appl. No.: 14/415,948

(22) PCT Filed: Jul. 11, 2013

(86) PCT No.: PCT/JP2013/068993
§ 371 (c)(1),
(2) Date: Jan. 20, 2015

(87) PCT Pub. No.: WO2014/017309
PCT Pub. Date: Jan. 30, 2014

(65) Prior Publication Data
US 2015/0181647 A1    Jun. 25, 2015

(30) Foreign Application Priority Data

Jul. 23, 2012 (JP) .................................. 2012-162753

(51) Int. Cl.
| | | |
|---|---|---|
| *H04W 88/16* | (2009.01) | |
| *H04L 29/08* | (2006.01) | |
| *H04L 12/24* | (2006.01) | |
| *H04W 24/02* | (2009.01) | |
| *H04W 84/14* | (2009.01) | |

(52) U.S. Cl.
CPC ......... *H04W 88/16* (2013.01); *H04L 41/0226* (2013.01); *H04L 67/125* (2013.01); *H04L 67/2823* (2013.01); *H04W 24/02* (2013.01); *H04W 84/14* (2013.01)

(58) Field of Classification Search
CPC ..... H04L 69/08; H04L 41/0806; H04L 67/12; H04L 45/121; H04W 76/023; H04W 4/005; H04W 72/1257; H04W 84/18; G05B 2219/25198
See application file for complete search history.

(56) References Cited

U.S. PATENT DOCUMENTS

| | | | | |
|---|---|---|---|---|
| 2009/0316628 A1* | 12/2009 | Enns | ................. | H04L 12/40006 370/328 |
| 2012/0236768 A1* | 9/2012 | Kolavennu | ......... | H04W 76/023 370/310 |

FOREIGN PATENT DOCUMENTS

| | | |
|---|---|---|
| JP | 01-252846 A | 10/1989 |
| JP | 2008-154087 A | 7/2008 |
| JP | 2010-237962 A | 10/2010 |

* cited by examiner

Primary Examiner — Jung-Jen Liu
(74) Attorney, Agent, or Firm — Sughrue Mion, PLLC

(57) ABSTRACT

A gateway device includes: a receiving unit configured to receive a response of a field device with respect to a request from a management apparatus managing the field device; a conversion unit configured to reference type information included in the response received by the receiving unit, the type information indicating a type of data format, and convert data included in the response to a data format suitable for processing by the management apparatus, the conversion being made in accordance with the type information; and a transmitting unit configured to transmit to the management apparatus the data converted by the conversion unit.

19 Claims, 5 Drawing Sheets

FIG.2A

| octets | bits | | | | | | | |
|---|---|---|---|---|---|---|---|---|
| | 7 | 6 | 5 | 4 | 3 | 2 | 1 | 0 |
| 1 | First octet in string | | | | | | | |
| ⋮ | ⋮ | | | | | | | |
| N | Last octet in string | | | | | | | |

R1 = { rows 1 through N }

FIG.2B

| octets | bits | | | | | | | |
|---|---|---|---|---|---|---|---|---|
| | 7 | 6 | 5 | 4 | 3 | 2 | 1 | 0 |
| 1 | Length in octets (N) | | | | | | | |
| 2 | First octet in string | | | | | | | |
| ⋮ | ⋮ | | | | | | | |
| N+1 | Last octet in string | | | | | | | |

R0 = { row 1 }
R1 = { rows 2 through N+1 }

FIG.3A

| octets | bits | | | | | | | |
|---|---|---|---|---|---|---|---|---|
| | 7 | 6 | 5 | 4 | 3 | 2 | 1 | 0 |
| R11 { 1 | Request ID | | | | | | | |
| R12 { 2 | Reserved for future use by this standard. For compliance with this version of this standard, these bits shall be set to 0 | | | | | | Version identification flag | Forward explicit congestion control echo |
| R13 { 3 | ServiceFeedbackCode | | | | | | | |
| R14 { 4 | 0 | Length-Optional, included only if ServiceFeedbackCode indicates success | | | | | | |
| R15 { 5···n | Value - OPTIONAL, present only if ServiceFeedbackCode only if indicates success | | | | | | | |

| octets | bits | | | | | | | |
|---|---|---|---|---|---|---|---|---|
| | 7 | 6 | 5 | 4 | 3 | 2 | 1 | 0 |
| R11 { 1 | Request ID | | | | | | | |
| R12 { 2 | Reserved for future use by this standard. For compliance with this version of this standard, these bits shall be set to 0 | | | | | | Version identification flag | Forward explicit congestion control echo |
| R13 { 3 | ServiceFeedbackCode | | | | | | | |
| R14 { 4 | 0 | Length - Length in octets of response parameters | | | | | | |
| R15 { 5···n | Response Parameters, OPTIONAL (included if Size of Response Parameters is present, and > 0) | | | | | | | |

F

GATEWAY DEVICE, COMMUNICATION SYSTEM, AND COMMUNICATION METHOD

CROSS REFERENCE TO RELATED APPLICATIONS

This application is a National Stage of International Application No. PCT/JP2013/068993, filed Jul. 11, 2013, claiming priority based on Japanese Patent Application No. 2012-162753, filed Jul. 23, 2012, the contents of all of which are incorporated herein by reference in their entirety.

TECHNICAL FIELD

The present invention relates to a gateway device, a communication system, and a communication method.

BACKGROUND ART

Conventionally, in order to achieve a high level of automated operation in a plant, a factory, or the like, a distributed control system (DSC) is implemented, in which on-site devices (measuring devices and actuator devices) referred to as field devices are connected via a communication means to a control apparatus that controls the field devices. Although the communication system that forms the base of such a distributed control system had been almost always one that communicates by cable, recent years have seen the appearance of ones that communicate wirelessly, in conformance with an industrial wireless communication standard such as ISA100.11a or WirelessHART (registered trademark).

For example, a communication system conforming to the above-noted ISA100.11a generally is constituted by a field devices capable of wireless communication (wireless field devices), a gateway device capable of wireless communication (wireless gateway device), and a management apparatus. The wireless gateway device forms a wireless communication network between the wireless gateway device and wireless field devices. The wireless gateway device, in addition to controlling the operation of wireless field devices that have joined the wireless communication network, performs tasks such as collecting various data obtained by the wireless field devices. The management apparatus is connected to the wireless gateway device via a communication line. The management apparatus manages the wireless field devices via the wireless gateway device.

Patent Reference 1 noted below discloses art for preventing faulty operation of terminals, even when there is a mixture of old terminals operating in accordance with an old protocol and new terminals adopting a new protocol in communication system such as a third-generation mobile communication system. The art disclosed in Patent Reference 1 does not communicate in conformance with the above-noted industrial wireless communication standard. Specifically, in Patent Reference 1, if a control signal is sent to another terminal, the control signal that is to be transmitted is intentionally changed (processed to cause an error), so that a specific error occurs in the other terminal, which is an existing terminal. In Patent Reference 1, this prevents faulty operation in both an old terminal and a new terminal.

PRIOR ART REFERENCE

Patent Reference

[Patent Reference 1] Japanese Patent Application Publication No. 2008-154087

SUMMARY OF THE INVENTION

Problem to be Solved by the Invention

Communication standards are often upgraded for various reasons, including improvement of existing functionality, addition of new functionality, and improvement of speed. For this reason, in the communication system disclosed in the above-noted Patent Reference 1 the situation occurs in which a single communication system may have a mixture of devices conforming to an old version of a communication standard and devices conforming to a new version of a communication standard.

At the current time, in the above-noted ISA100.11a communication standard, there is an ISA100.11a-2009 version (old version) and an ISA100.11a-2011 version (new version). Wireless field devices conforming to the old version already exist as products. Wireless field devices conforming to the new version will be made into products. For this reason, when wireless field devices conforming to the new version appear as products, the situation will occur in which there is a mixture of wireless field devices conforming to old and new versions in a single wireless communication system.

In this case, there are differences in the formats of specific data types (OctetString, Bitstring, and VisibleString) between the old and new versions of the ISA100.11a. Specifically, the data format of the old version has only a data region into which data is stored. In contrast, the data format of the new version has a size region that stores the size of the data to be stored in the data region added before the data region.

If there is a mixture of wireless field devices conforming to the old version and wireless field devices conforming to the new version, which have differences as described above, a management apparatus that manages these wireless field devices cannot perform normal data transmission and receiving with each of the wireless field devices. Given this, if the management apparatus can identify the versions to which a wireless field device transmitting data conforms, it may be possible to perform normal transmission and receiving of data with each of the wireless field devices. However, the functionality of the management apparatus is achieved by executing a plurality of programs, and the modification of all these programs is impractical, since it would require a very large amount of effort.

The present invention provides a gateway device, a communication system having the gateway device, and a communication method that enable communication between devices conforming to different versions of a communication standard, without requiring a very large amount of effort.

Means to Solve the Problem

A first aspect of the present invention is a gateway device including: a receiving unit configured to receive a response of a field device with respect to a request from a management apparatus managing the field device; a conversion unit configured to reference type information included in the response received by the receiving unit, the type information indicating a type of data format, and convert data included in the response to a data format suitable for processing by the management apparatus, the conversion being made in accordance with the type information; and a transmitting unit configured to transmit to the management apparatus the data converted by the conversion unit.

According to the first aspect, when a response of a field device for a request from a management apparatus is transmitted, type information which indicates a type of data format included in the response is referenced, data included in the response is converted, in response to the type information, into a data format suitable for processing by the management apparatus, and transmitted to the management apparatus.

In the first aspect of the present invention, the type information included in the response may be one of a first information and a second information, the first information indicating a first data format having only a first region in which data included in the response is stored, the second information indicating a second data format having the first region and a second region, the second region storing information indicating the size of data stored in the first region.

In the first aspect of the present invention, the data format suitable for processing by the management apparatus may be the first data format.

In the first aspect of the present invention, when information indicating that receiving of a request from the management apparatus has failed is included in the response by the field device, a request from the management apparatus may be converted to the second data format and transmitted to the field device.

In the first aspect of the present invention, the conversion unit may be configured to judge whether or not the response received by the receiving unit includes information indicating that the field device has succeeded in prescribed processing.

In the first aspect of the present invention, when the conversion unit judges that the response received by the receiving unit includes information indicating that the field device has succeeded in the prescribed processing, the conversion unit may be configured to judge whether or not the type information included in the response received by the receiving unit and indicating the type of data format is a second data format that is different from a first data format.

In the first aspect of the present invention, when the conversion unit judges that the type information included in the response received by the receiving unit and indicating the type of data format is the second data format that is different from the first data format, the conversion unit may be configured to convert data included in the response from the second data format to the first data format.

In the first aspect of the present invention, when the conversion unit judges that the type information included in the response received by the receiving unit and indicating the type of data format is not the second data format, the transmitting unit may be configured to transmit, to the management apparatus, data included in the response received by the receiving unit.

In the first aspect of the present invention, when the conversion unit judges that the response received by the receiving unit does not include information indicating that the field device has succeeded in the prescribed processing, the transmitting unit may be configured to transmit, to the management apparatus, data included in the response received by the receiving unit.

In the first aspect of the present invention, the conversion unit may be configured to judge whether or not type information included in the response received by the receiving unit and indicating the type of data format is a second data format that is different from a first data format.

In the first aspect of the present invention, when the conversion unit judges that type information included in the response received by the receiving unit and indicating the type of data format is the second data format, the conversion unit may be configured to convert data included in the response from the second data format to the first data format.

In the first aspect of the present invention, when the conversion unit judges that type information included in the response received by the receiving unit and indicating the type of data format is not the second data format, the transmitting unit may be configured to transmit, to the management apparatus, data included in the response received by the receiving unit.

In the first aspect of the present invention, the prescribed processing may be at least one of parameter readout by the field device and parameter writing by the field device.

In the first aspect of the present invention, the first data format may be older than the second data format.

In the first aspect of the present invention, the first data format and the second data format may be used in an ISA100.11a wireless communication standard.

In the first aspect of the present invention, the second data format may be the first data format to which a size region into which information indicating the size of data stored in the data region is stored has been added.

In the first aspect of the present invention, the conversion unit may be configured to delete the size region from the second data format to convert the second data format to the first data format.

In the first aspect of the present invention, the receiving unit may be configured to receive the request from the management apparatus, the conversion unit may be configured to convert the request received by the receiving unit to the first data format, and the transmitting unit may be configured to transmit, to the field device, the request of the first data format converted by the conversion unit.

A second aspect of the present application is a communication system including: a field device; a management apparatus configured to manage the field device; a gateway device configured to relay communication between the field device and the management apparatus, wherein the gateway device includes: a receiving unit configured to receive a response of the field device with respect to a request from the management apparatus; a conversion unit configured to reference type information included in the response received by the receiving unit and indicating the type of data format, and convert data included in the response to a data format suitable for processing by the management apparatus, the conversion being made in accordance with the type information; and a transmitting unit configured to transmit to the management apparatus the data converted by the conversion unit.

A third aspect of the present application is a communication method including: receiving a response of a field device with respect to a request from a management apparatus that manages the field device; referencing type information that is included in the received response and that indicates the type of data format and converting data included in the response to a data format suitable for processing by the management apparatus, the conversion being made in accordance with the type information; and transmitting the converted data to the management apparatus.

Effect of the Invention

According to an embodiment of the present invention, when a response of a field device with respect to a request from an apparatus is transmitted to the gateway device, the gateway device references type information included in the response indicating the type of data format and, in accordance with the type information, converts data included in the response to a data format suitable for processing by the management apparatus and transmits it to the management apparatus, thereby enabling communication between devices conforming to communication standards of different versions, without the need for a very large effort.

BRIEF DESCRIPTION OF THE DRAWINGS

FIG. 2A is a drawing showing an example of the data format of an old version of data transmitted and received in an embodiment of the present invention.

FIG. 2B is a drawing showing an example of the data format of a new version of data transmitted and received in an embodiment of the present invention.

FIG. 3A is a drawing showing an example of the header format of a read response transmitted from an I/O device in an embodiment of the present invention.

FIG. 3B is a drawing showing an example of the header format of an execute response transmitted from an I/O device in an embodiment of the present invention.

EMBODIMENT FOR CARRYING OUT THE INVENTION

Figure 1:
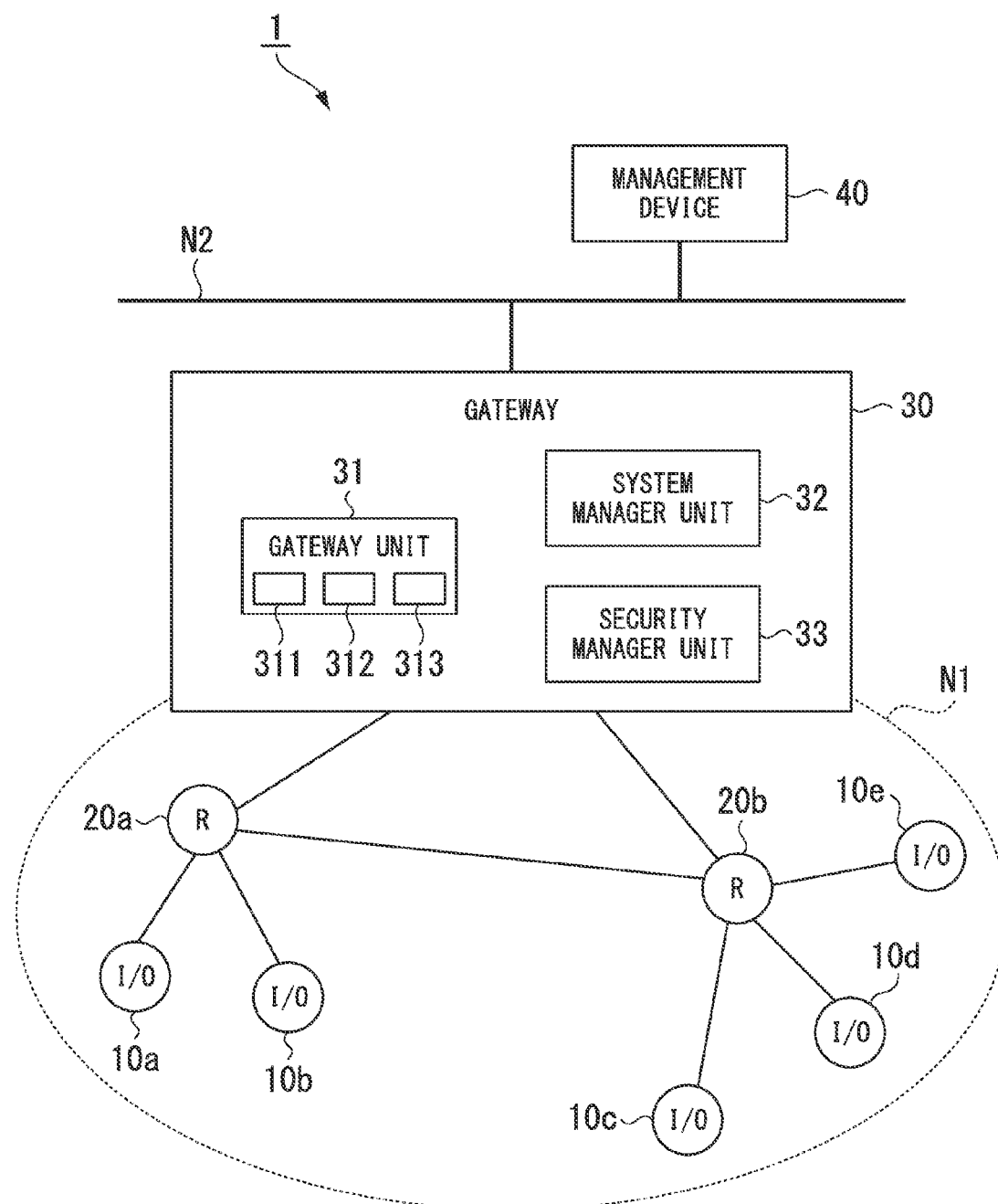
FIG. 1 is a block diagram showing the overall constitution of a communication system according to an embodiment of the present invention.

A gateway device, a communication system, and a communication method according to an embodiment of the present invention will be described in detail below, with references made to the drawings. FIG. 1 is a block diagram showing the overall constitution of a communication system according to an embodiment of the present invention. As shown in FIG. 1, a communication system 1 of the present embodiment has I/O devices 10a to 10e (field devices), routing devices 20a and 20b, a gateway 30 (gateway device), and a management apparatus 40. Communication is possible via the wireless communication network N1 between the I/O devices 10a to 10e and the management apparatus 40, under control by the gateway 30. The numbers of I/O devices 10a to 10e and the routing devices 20a and 20b are arbitrary as shown in FIG. 1.

The I/O devices 10a to 10e are wireless field devices installed in a plant or factory, such as sensor devices such as flow gauges and temperature sensors, valve devices such as flow control valves and open/close valves, and actuator devices such as fans and motors. The I/O devices 10a to 10e communicate wirelessly in conformance with ISA100.11a, which is an industrial automation wireless communication standard. The operation of the I/O devices 10a to 10e is controlled by the management apparatus 40 setting various parameters with respect to the I/O devices 10a to 10e. The measurement data obtained by the I/O devices 10a to 10e is collected by the management apparatus 40 via the gateway 30.

In this case, in the above-noted ISA100.11a wireless communication standard, there is the ISA100.11a-2009 (hereinafter called the old version) and the ISA100.11a-2011 (hereinafter called the new version). In the present embodiment, as an aid to understanding, the description is for the case in which, of the I/O devices 10a to 10e, the two I/O devices 10a and 10b conform to the new version, and the remaining three I/O devices 10c to 10e conform to the old version. Between the old version and the new version, there are differences in the data formats of specific data types (OctetString, BitString, and VisibleString). The differences between these data formats will be described later.

The routing devices 20a and 20b communicate wirelessly between the I/O devices 10a to 10e and the gateway 30 in conformance with the ISA100.11a wireless communication standard. The routing devices 20a and 20b relay data transmitted and received between the I/O devices 10a to 10e and the gateway 30. The routing devices 20a and 20b are not influenced by the differences between the old and new versions of the ISA100.11a wireless communication standard.

The above-noted I/O devices 10a to 10e, by wireless connection with the routing devices 20a and 20b and the gateway 30, form a star mesh configured wireless communication network N1. The I/O devices may be provided with the functionality (relaying function) of the routing devices 20a and 20b instead of having the routing devices 20a and 20b.

The gateway 30 has a gateway unit 31, a system manager unit 32, and a security manager unit 33. The gateway 30 controls communication performed by the communication system 1. The gateway unit 31 connects the wireless communication network N1 formed by the I/O devices 10a to 10e and the like and the cable plant network N2 to which the management apparatus 40 is connected. The gateway unit 31 relays various data transmitted and received between the I/O devices 10a to 10e and the like and the management apparatus 40. The gateway unit 31 communicates wirelessly in conformance with the above-noted ISA100.11a wireless communication standard.

The gateway unit 31 converts data formats, so as to absorb the differences between versions of the above-noted ISA100.11a wireless communication standard. The gateway unit 31 has a receiving unit 311, a conversion unit 312, and a transmitting unit 313. Specifically, the receiving unit 311 receives responses of the I/O devices 10a to 10e with respect to a request from the management apparatus 40. The conversion unit 312 references a version identification flag (type information) indicating the type of data format included in the response received by the receiving unit 311 and converts data included in the response to a data format suitable for processing by the management apparatus 40 in accordance with the value of the version identification flag. The transmitting unit 313 transmits data converted by the conversion unit 312 to the management apparatus 40.

More specifically, if the conversion unit 312 of the gateway unit 31 judges that the value of the version identification flag included in a response from the I/O devices 10a to 10e is a value indicating the new version format (second data format) (1, the second information), the conversion unit 312 converts the data included in the response to a data format suitable for processing by the management apparatus 40 (old version data format). The transmitting unit 313 then transmits the data converted by the conversion unit 312 to the management apparatus 40. In contrast, if the conversion unit 312 judges that that the value of the version identification flag included in the response from the I/O devices 10a to 10e is a value indicating the old version format (first data format) (0, the first information), the transmitting unit 313 transmits the data with the data format of the data included in the response, without converting the data format, to the management apparatus 40.

A response in which the version identification flag value is 0 is a response transmitted from a I/O device 10c to 10e, which conform to the old version. In contrast, a response in which the version identification flag value is 1 is a response transmitted from a I/O device 10a or 10b, which conform to the new version. The details of the conversion processing performed by the conversion unit 312 of the gateway unit 31 will be described later.

The system manager unit 32 manages and controls wireless communication via the wireless communication network N1. Specifically, the system manager unit 32 manages and controls resource, such as the frequency channel, communication schedule, communication path, and the like of the wireless communication network N1.

The system manager unit 32, acting in concert with the security manager unit 33, performs joining processing that joins to the wireless communication network N1 an I/O device that has not joined the wireless communication network N1.

The security manager unit 33 manages security, under the system manager unit 32. For example, a whitelist indicating I/O devices allowed to join the wireless communication network N1 and a blacklist indicating I/O devices refused joining to the wireless communication network N1 is stored into the security manager unit 33. The security manager unit 33 references these lists and manages the I/O devices that have joined the wireless communication network N1. The system manager unit 32 performs the above-noted joining process by referencing the contents of the above-noted lists recorded in the security manager unit 33.

The management apparatus 40 is connected to the cable plant network N2. The management apparatus 40 is operated by, for example, an administrator of the communication system 1. The management apparatus 40, for example, collects measurement data measured by the I/O devices 10a to 10e and sets parameters with respect to the I/O devices 10a to 10e by transmitting, to the I/O devices 10a to 10e, a request in response to an instruction of the administrator. Specifically, the management apparatus 40 collects measurement data by transmitting a read quest to the I/O devices 10a to 10e and sets parameters by transmitting a write request.

Requests transmitted from the management apparatus 40, in addition to the above-noted read and write requests, include execute requests that request an I/O device 10a to 10e to execute processing. An execute request is transmitted from the management apparatus 40 when, for example, upgrading of the firmware provided in the I/O devices 10a to 10e is done. The management apparatus 40 can process data in the data format of the old version, but cannot process data in the data format of the new version.

Next, the differences between the above-described data formats of the old version and the new version will be described in detail. FIG. 2A and FIG. 2B show examples of the data format of data transmitted and received in an embodiment of the present invention, FIG. 2A showing the data format of the old version and FIG. 2B showing the data format of the new version. The data formats shown in FIG. 2A and FIG. 2B are those of the OctetString data type.

As shown in FIG. 2A, the data format of the old version (first data format) is constituted by only a data region R1 (first region), into which data (data of the first through the Nth octets) that is divided into 8-bit units of bit 0 through bit 7 is stored. In contrast, as shown in FIG. 2B, the data format of the new version (second data format) is constituted by adding, before the data region R1, a size region R0 (second region), into which information indicating the size of data stored in the data region R1 is stored. That is, in the new version data format, the size region R0 is provided as the first octet, with the 2nd through the (N+1)th octets as the data region R1.

In the new version data format, the above-noted size region R0 is added to transmit and receive a plurality of data at one time. Although details will be described later, regardless of whether the data format is the old version data format or the new version data format, the total data amount transmitted or received at one time is separately managed. The old version data format, as shown in FIG. 2A, is the data region R1 only. In the old version data format, because the size of the data stored in the data region R1 is managed by the above-noted total data amount, only one data can be transmitted or received at one time. In contrast, in the new version data format, the size of the data stored in the data region R1 is indicated by information stored in the size region R0, and the overall transmitted and received data size is managed by the above-noted overall data amount. For this reason, in the new version data format, if a plurality of size regions R0 and data regions R1 are provided, a plurality of data can be transmitted and received at one time.

Next, the format of the response transmitted from the I/O devices 10a to 10e will be described. FIG. 3A and FIG. 3B show examples of the header format of a response transmitted from an I/O device in an embodiment of the present invention. FIG. 3A shows the header format of a response (read response) with respect to a read request from the management apparatus 40, and FIG. 3B shows the header format of a response (execute response) with respect to an execute request from the management apparatus 40.

As shown in FIG. 3A and FIG. 3B, the header of a response transmitted from the I/O devices 10a to 10e has the four regions R11 to R14 (the 1st to the 4th octets), in which 8-bit data (octets) constituted by the 0th to the 7th bits is stored. The region R15 (5th to n-th octets) is a region into which measurement data measured by the I/O devices 10a to 10e, or parameters and the like to be set into the I/O devices 10a to 10e are stored.

The data stored in the region R15 is, for example, data in a data format such as shown in FIG. 2A or FIG. 2B.

The region R11 is a region in which identification information (request ID) for identifying a request transmitted from the management apparatus 40 is stored. The identification information stored in the region R11 is used to associate a request transmitted from the management apparatus 40 and a response from an I/O device 10a to 10e. That is, mutually different identification information is allocated to requests transmitted from the management apparatus 40. The region R11 provided in the response header transmitted from an I/O device 10a to 10e stores the same identification information as allocated to the request. Thus, the identification information enables an association to be made between a request and a response.

The region R12 is a reserved region. In the present embodiment, the version identification flag F is allocated to the 1st bit of the region R12. The version identification flag F indicates whether the format of the data stored in the region R15 is the old version or the new version. Specifically, a version identification flag F in which value is 0 indicates that the data format is the old version, and a version identification in which flag F value is 1 indicates that the data format is the new version. As noted above, the gateway unit 31 of the gateway 30 references the version identification flag F allocated to the 1st bit of the region R12 and switches between conversion and non-conversion of the data format.

The region R13 is a region, in which information (Service Feedback Code) indicating whether or not the processing performed by an I/O device 10a to 10e in response to a request transmitted from the management apparatus 40 has succeeded is stored. For example, if a request is made by the management apparatus 40 to instruct the writing of a parameter with respect to an I/O device 10a to 10e for which parameter writing is prohibited, information indicating that the parameter writing has failed is stored into the region R13. The region R14 is a region in which the total data amount of data stored in the region R15 is stored.

Figure 4:
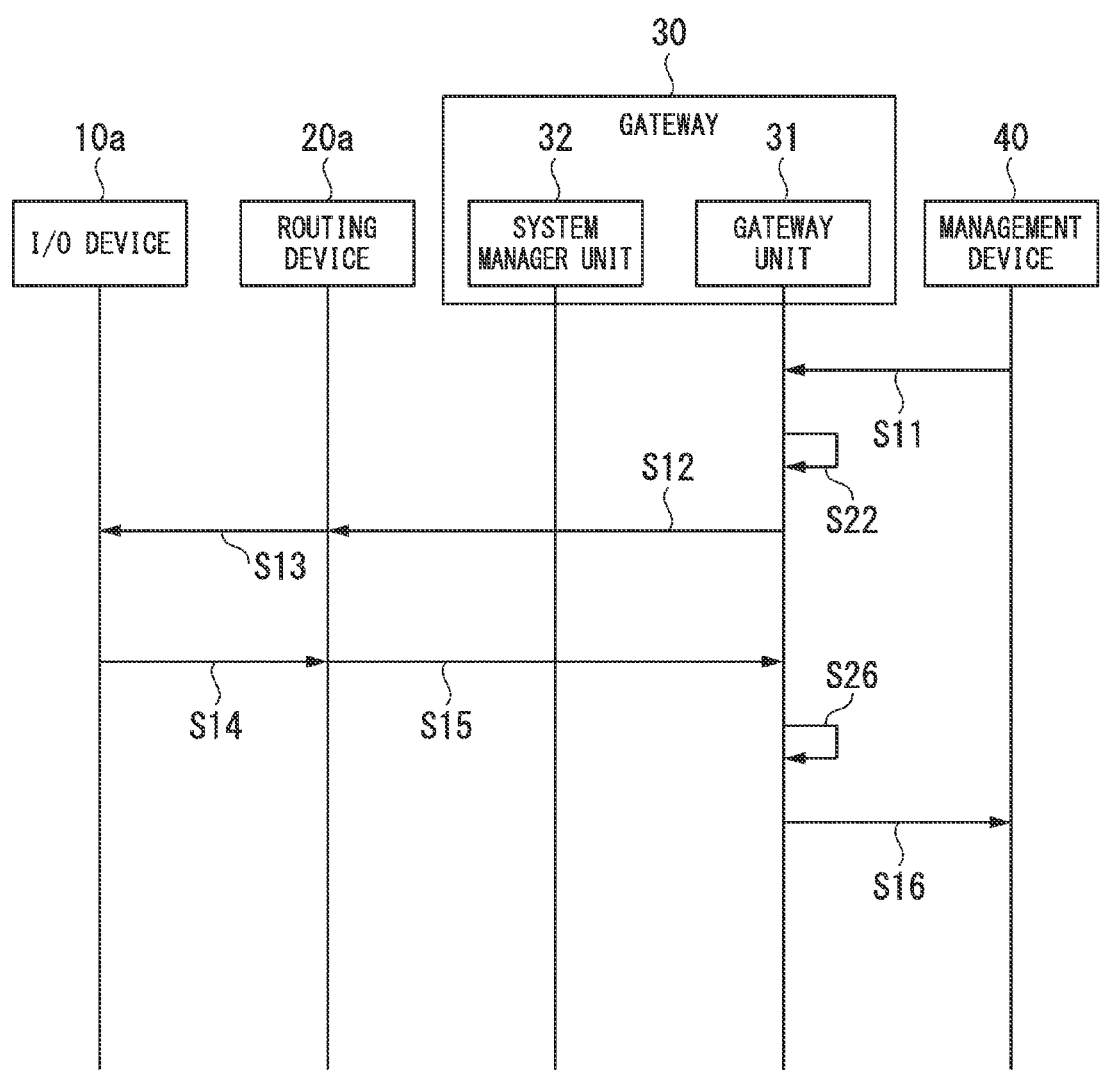
FIG. 4 is a timing diagram for describing the operation of a communication system according to an embodiment of the present invention.
Figure 5:
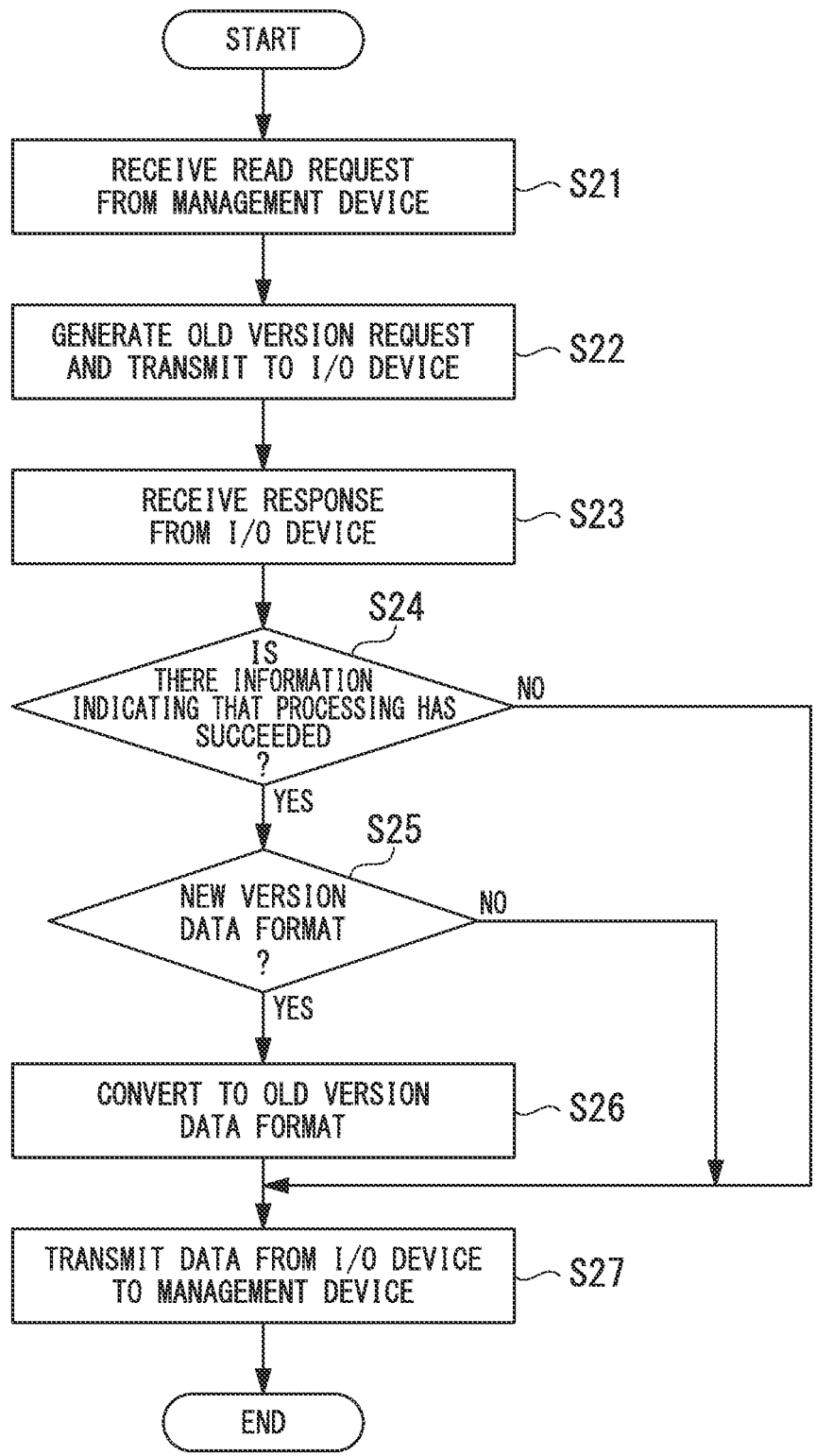
FIG. 5 is a flowchart for describing the operation performed in a gateway device according to an embodiment of the present invention.

Next, the operation of the communication system 1 having the above-noted constitution will be described. FIG. 4 is a timing diagram for describing the operation of the communication system 1 according to an embodiment of the present invention. FIG. 5 is a flowchart showing the processing performed by the gateway 30 according to an embodiment of the present invention. In the following, as an aid to understanding, the description will be for operation when the management apparatus 40 obtains a parameter of the I/O device 10a conforming to the new version.

First as shown in FIG. 4, a read request (ReadRequest) for requesting the readout of a parameter of the I/O device 10a is transmitted from the management apparatus 40 to the I/O device 10a (step S11 in FIG. 4). This read request includes a device identifier allocated to the I/O device 10a, a parameter ID that is an identifier identifying the parameter that is to be obtained, and a request ID that is identification information identifying the request.

The read request transmitted from the management apparatus 40 to the I/O device 10a, as shown in FIG. 4 and FIG. 5, is received by the receiving unit 311 of the gateway unit 31 of the gateway 30 (step S21 in FIG. 5). Upon receiving the read request, the conversion unit 312 of the gateway unit 31 of the gateway 30 generates a packet to which a header required for wireless communication via the wireless communication network N1 with respect to the read request from the management apparatus 40 is appended. The transmitting unit 313 of the gateway unit 31 transmits the packet generated by the conversion unit 312 to the I/O device 10a as an old version request (client request; Client.Request) (step S22 in FIG. 4 and FIG. 5). This client request, as shown in FIG. 4, is first transmitted to the routing device 20a (step S21 in FIG. 4) and then transmitted from the routing device 20a to the I/O device 10a (step S13 in FIG. 4). This enables the I/O device 10a to receive the client request of the old version of the wireless communication standard, even if I/O device 10a does not conform to the new version of the wireless communication standard. The I/O device 10a can thus return to the gateway 30 a client response with respect to the client request.

Upon receiving the client request (read request from the management apparatus 40) from the transmitting unit 313 of the gateway unit 31 of the gateway 30, the I/O device 10a reads out the parameter instructed in the client request (the parameter identified by the parameter ID included in the read request). The I/O device 10a transmits to the management apparatus 40 a client response (Client.Response) that includes the read out parameter. This client response, as shown in FIG. 4, is first transmitted to the routing device 20a (step S14 in FIG. 4) and then transmitted from the routing device 20a to the gateway unit 31 of the gateway 30 (step S15 in FIG. 4).

In this case, the client response transmitted to the management apparatus 40 from the I/O device 10a has the header shown in FIG. 3A. Specifically, the request ID included in the read request transmitted from the management apparatus 40 at step S11 is stored in the region R11. Also, a version identification flag F of the value 1 is stored in the 1st bit of the region R12, and information indicating that the parameter readout has succeeded is stored in the region R13. This provides the header in which the total data amount in the parameter read out by the I/O device 10a is stored in the region R14.

The parameter read out at the I/O device 10a is stored in the region R15 shown in FIG. 3A.

The client response transmitted to the management apparatus 40 from the I/O device 10a, as shown in FIG. 4 and FIG. 5, is received by the receiving unit 311 of the gateway unit 31 of the gateway 30 (step S23 in FIG. 5). Upon receiving the client response, the conversion unit 312 of the gateway unit 31 provided in the gateway 30, deletes the header appended for performing wireless communication via the wireless communication network N1 and then judges whether the received client response has information indicating that the processing by the I/O device 10a has succeeded (step S24 in FIG. 5). Specifically, the conversion unit 312 judges whether or not information indicating that the parameter readout has succeeded is stored in the region R13 of the header of the client response.

At this point, the case in which the parameter readout at the I/O device 10a succeeds and information to the effect that the parameter readout has succeeded is stored in the region R13 as noted above, will be described. This being the case, the judgment result at step S24 is YES, and the conversion unit 312 of the gateway unit 31 judges whether or not the data format is the new version (step S25 in FIG. 5).

Specifically, the conversion unit 312 judges whether the value of the version identification flag F stored in the region R12 of the client response header is 1.

The case in which the I/O device 10a conforms to the new version, and a version identification flag F of the value 1, as described above, is stored in the 1st bit of the region R12 will be described. In this case, therefore, the judgment result at step S25 is YES, and the conversion unit 312 of the gateway unit 31 converts the parameter stored in the region R15 shown in FIG. 2A to a data format (old version data format) suitable for processing by the management apparatus 40 (step S26 in FIG. 5). For example, the conversion unit 312 converts the new version data format shown in FIG. 2B to the old version data format shown in FIG. 2A by deleting the size region R0 from the new version data format shown in FIG. 2B.

When the conversion processing has ended, the transmitting unit 313 of the gateway unit 31 transmits the parameter of which data format had been converted to the management apparatus 40 (step S27 in FIG. 5). The parameter transmitted from the transmitting unit 313 of the gateway unit 31 is transmitted to the management apparatus 40 via the plant network N2 (step S16 in FIG. 4) as a read response. If the judgment result at step S25 is NO, the processing of step S26 is not performed, and the parameter included in the response received at step S23 is transmitted as the read response from the transmitting unit 313 to the management apparatus 40 via the plant network N2 (step S16 in FIG. 4).

In this case, at step S24, if information indicating that the processing has succeeded was not included in the received client response (the case in which there is information indicating that the processing has failed), the judgment result at step S24 is NO, and the transmitting unit 313 of the gateway unit 31 transmits to the management apparatus 40 the error information (information to the effect that the parameter readout processing has failed) stored in the region R13 of the response received at step S23 of FIG. 5.

The description has been for the case in which, in FIG. 5, the conversion unit 312 judges as to whether or not there is information indicating processing success (step S24), the judgment was that there was information indicating processing success (YES at step S24), and the conversion unit 312 judges as to whether or not the data format is the new version data format (step S25). By performing processing such as this, if the judgment is that there is no information indicating processing success, because the transmitting unit 313 of the gateway unit 31 can transmit the data from the I/O device 10a to the management apparatus 40 without performing the processing of step S25, it is possible to reduce the processing by the gateway unit 31.

Although the description has been for the case of executing the processing of step S24 in FIG. 5, when the processing of step S23 ends, processing may proceed to step S26 without executing the processing of step S24.

The foregoing has been a description of operation for the case of the management apparatus 40 obtaining a parameter of the I/O device 10a, which conforms to the new version. If the management apparatus 40 makes a request to the I/O device 10a, which conforms to new version, for either parameter writing or processing execution, a write request or execute request for the I/O device 10a is transmitted from the management apparatus 40, and received by the receiving unit 311 of the gateway unit 31 of the gateway 30 (step S21 in FIG. 5). Then, processing by the same procedure as the processing described using FIG. 4 and FIG. 5 is performed in the receiving unit 311, the conversion unit 312, and the transmitting unit 313 of the gateway unit 31 of the gateway 30.

At step S24, however, if there is no information in the received client response indicating processing success (the case in which there is information indicating that the parameter writing or an execution has failed), the judgment result at step S24 is NO. The result is that the gateway 31 performs processing so that, from the write request or execute request received at step S21, the conversion unit 312 generates a new version request (client request: Client.Request), and so that the transmitting unit 313 transmits it to the I/O device 10a. Processing is then performed to receive a response from the I/O device 10a with respect to the request (step S23 in FIG. 5). At step S24, if there is information in the received client response indicating processing success (the judgment result at step S24 is YES), the processing of steps S25 to S27 is performed.

As noted above, the present embodiment references the value of the version identification flag F included in the response of the I/O device 10a with respect to a read request form the management apparatus 40. Then, if the conversion unit 312 judges that the value of the version identification flag F is 1, the conversion unit 312 converts the parameter included in the response by the I/O device 10a to an old version data format suitable for processing by the management apparatus 40 and the transmitting unit 313 transmits it to the management apparatus 40. For this reason, for example, it is possible to communicate between the I/O device 10a and 10b and the management apparatus 40, which conform to different versions, without requiring a very large amount of effort to modify all the programs implanting the functionality of the management apparatus 40.

Although the foregoing has been a description of a gateway device, a communication system, and a communication method according to an embodiment of the present invention, the present invention is not limited to the above-noted embodiment, and can be freely modified, within the scope of the present invention. For example, although in the above-noted embodiment the description has taken the example of different versions of the ISA100.11a wireless communication standard, the present invention may also be applied to a communication standard other than the ISA100.11a wireless communication standard (for example, WirelessHART (registered trademark), and the like).

Also, the above-noted embodiment has been described for the situation in which the gateway unit 31, the system manager unit 32, and the security manager unit 33 are provided in the gateway 30.

However, the gateway unit 31, the system manager unit 32, and the security manager unit 33 may each be implemented as separate devices. Additionally, the functionality that wirelessly communicates with the I/O devices 10a to 10e and the routing devices 20a and 20b may be separated from the gateway unit 31 and implemented as a wireless access point device.

INDUSTRIAL APPLICABILITY

The present invention may be applied to a gateway device, a communication system having the gateway device, and communication method and the like required to communicate with devices conforming to different versions of communication standards without requiring a very large amount of effort.

DESCRIPTION OF REFERENCE SYMBOLS

1 Communication system
10a to 10e I/O device
30 Gateway
40 Management apparatus
311 Receiving unit
312 Conversion unit
313 Transmitting unit
F Version identification flag
R1 Data region
R0 Size region

The invention claimed is:
1. A gateway device comprising:
   a receiving unit configured to receive a response of a field device with respect to a request from a management apparatus managing the field device;
   a conversion unit configured to reference type information included in the response received by the receiving unit, the type information indicating a type of data format, and convert data included in the response to a data format suitable for processing by the management apparatus, the conversion being made in accordance with the type information; and
   a transmitting unit configured to transmit to the management apparatus the data converted by the conversion unit,
   wherein the conversion unit is configured to judge whether or not the type information included in the response received by the receiving unit and indicating the type of data format is a second data format that is different from a first data format, and wherein the first data format and the second data format are data formats to be used in a same wireless communication standard.

2. The gateway device according to claim 1, wherein the type information included in the response is one of a first information and a second information, the first information indicating a first data format having only a first region in which data included in the response is stored, the second information indicating a second data format having the first region and a second region, the second region storing information indicating the size of data stored in the first region.

3. The gateway device according to claim 2, wherein the data format suitable for processing by the management apparatus is the first data format.

4. The gateway device according to claim 3, wherein when information indicating that receiving of a request from the management apparatus has failed is included in the response by the field device, a request from the management apparatus is converted to the second data format and transmitted to the field device.

5. The gateway device according to claim 2, wherein
the receiving unit is configured to receive the request from the management apparatus,
the conversion unit is configured to convert the request received by the receiving unit to the first data format, and
the transmitting unit is configured to transmit, to the field device, the request of the first data format converted by the conversion unit.

6. The gateway device according to claim 1, wherein the conversion unit is configured to judge whether or not the response received by the receiving unit includes information indicating that the field device has succeeded in prescribed processing.

7. The gateway device according to claim 6, wherein when the conversion unit judges that the response received by the receiving unit includes information indicating that the field device has succeeded in the prescribed processing, the conversion unit is configured to judge whether or not type information included in the response received by the receiving unit and indicating the type of data format is a second data format that is different from a first data format.

8. The gateway device according to claim 7, wherein when the conversion unit judges that the type information included in the response received by the receiving unit and indicating the type of data format is the second data format that is different from the first data format, the conversion unit is configured to convert data included in the response from the second data format to the first data format.

9. The gateway device according to claim 7, wherein when the conversion unit judges that the type information included in the response received by the receiving unit and indicating the type of data format is not the second data format, the transmitting unit is configured to transmit, to the management apparatus, data included in the response received by the receiving unit.

10. The gateway device according to claim 7, wherein when the conversion unit judges that the response received by the receiving unit does not include information indicating that the field device has succeeded in the prescribed processing, the transmitting unit is configured to transmit, to the management apparatus, data included in the response received by the receiving unit.

11. The gateway device according to claim 6, wherein the prescribed processing is at least one of parameter readout by the field device and parameter writing by the field device.

12. The gateway device according to claim 1, wherein when the conversion unit judges that type information included in the response received by the receiving unit and indicating the type of data format is the second data format, the conversion unit is configured to convert data included in the response from the second data format to the first data format.

13. The gateway device according to claim 1, wherein when the conversion unit judges that type information included in the response received by the receiving unit and indicating the type of data format is not the second data format, the transmitting unit is configured to transmit, to the management apparatus, data included in the response received by the receiving unit.

14. The gateway device according to claim 1, wherein the first data format is older than the second data format.

15. The gateway device according to claim 1, wherein the same wireless communication standard is an ISA100.11a wireless communication standard.

16. The gateway device according to claim 1, wherein the second data format is the first data format to which a size region into which information indicating the size of data stored in the data region is stored has been added.

17. The gateway device according to claim 16, wherein the conversion unit is configured to delete the size region from the second data format to convert the second data format to the first data format.

18. A gateway device comprising:
a receiving unit configured to receive a response of a field device with respect to a request from a management apparatus managing the field device;
a conversion unit configured to reference type information included in the response received by the receiving unit, the type information indicating a type of data format, and convert data included in the response to a data format suitable for processing by the management apparatus, the conversion being made in accordance with the type information; and
a transmitting unit configured to transmit to the management apparatus the data converted by the conversion unit,
wherein the type information included in the response is one of a first information and a second information, the first information indicating a first data format having only a first region in which data included in the response is stored, the second information indicating a second data format having the first region and a second region, the second region storing information indicating the size of data stored in the first region,
wherein the data format suitable for processing by the management apparatus is the first data format, and
when information indicating that receiving of a request from the management apparatus has failed is included in the response by the field device, a request from the management apparatus is converted to the second data format and transmitted to the field device.

19. A gateway device comprising:
a receiving unit configured to receive a response of a field device with respect to a request from a management apparatus managing the field device;
a conversion unit configured to reference type information included in the response received by the receiving unit, the type information indicating a type of data format, and convert data included in the response to a data format suitable for processing by the management apparatus, the conversion being made in accordance with the type information; and a transmitting unit configured to transmit to the management apparatus the data converted by the conversion unit, wherein the conversion unit is configured to judge whether or not type information included in the response received by the receiving unit and indicating the type of data format is a second data format that is different from a first data format, wherein the second data format is the first data format to which a size region into which information indicating the size of data stored in the data region is stored has been added.

* * * * *